(12) United States Patent
Han et al.

(10) Patent No.: US 10,761,851 B2
(45) Date of Patent: Sep. 1, 2020

(54) MEMORY APPARATUS AND METHOD FOR CONTROLLING THE SAME

(71) Applicant: ALIBABA GROUP HOLDING LIMITED, George Town, Grand Cayman (KY)

(72) Inventors: Liang Han, San Mateo, CA (US); Xiaowei Jiang, San Mateo, CA (US); Jian Chen, San Mateo, CA (US)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 73 days.

(21) Appl. No.: 16/231,323

(22) Filed: Dec. 21, 2018

(65) Prior Publication Data

US 2019/0196831 A1    Jun. 27, 2019

Related U.S. Application Data

(60) Provisional application No. 62/610,089, filed on Dec. 22, 2017.

(51) Int. Cl.
| | |
|---|---|
| *G06F 13/00* | (2006.01) |
| *G06F 9/30* | (2018.01) |
| *G06F 9/38* | (2018.01) |
| *G06F 3/06* | (2006.01) |

(52) U.S. Cl.
CPC .......... *G06F 9/30189* (2013.01); *G06F 3/061* (2013.01); *G06F 3/064* (2013.01); *G06F 3/0634* (2013.01); *G06F 3/0679* (2013.01); *G06F 9/30036* (2013.01); *G06F 9/3887* (2013.01)

(58) Field of Classification Search
CPC ....... G06F 3/0601; G06F 3/061; G06F 9/3887
See application file for complete search history.

(56) References Cited

U.S. PATENT DOCUMENTS

| | | | |
|---|---|---|---|
| 2003/0050944 A1 | 3/2003 | Gay-Bellile et al. | |
| 2005/0125594 A1* | 6/2005 | Mattausch | G11C 8/12 711/5 |
| 2006/0218362 A1* | 9/2006 | McManis | H04L 69/329 711/162 |
| 2008/0189452 A1* | 8/2008 | Merry | G06F 3/061 710/56 |
| 2009/0168525 A1* | 7/2009 | Olbrich | G06F 13/1657 365/185.11 |
| 2011/0072243 A1* | 3/2011 | Qiu | G06F 9/30098 712/214 |
| 2014/0143367 A1 | 5/2014 | Dahlin et al. | |
| 2016/0335028 A1* | 11/2016 | Chung | G06F 3/0613 |
| 2017/0083314 A1 | 3/2017 | Burger et al. | |

OTHER PUBLICATIONS

PCT International Search Report dated Apr. 2, 2019, issued in corresponding International Application No. PCT/US2018/067370 (3 pgs.).

* cited by examiner

*Primary Examiner* — Sean D Rossiter
(74) *Attorney, Agent, or Firm* — Finnegan, Henderson, Farabow, Garrett & Dunner, LLP

(57) ABSTRACT

The present disclosure provides a memory apparatus comprising a first set of storage blocks operating as a set of read storage blocks in a first computation layer and as a set of write storage blocks in a second computation layer, where the second computation layer follows the first computation layer. The memory apparatus also comprises a second set of storage blocks operating as a set of write storage blocks in the first computation layer and as a set of read storage blocks in the second computation layer.

39 Claims, 12 Drawing Sheets

|  | Logic Array | Physical Memory | Operational Mode |
|---|---|---|---|
| Layer-1 | A1[ ] as input | computer reads block 1 | Computation |
|  | W1[ ] as input | computer reads block 0 | Computation |
|  | A2[ ] as output | computer writes block 2 | Result |
|  | W2[ ] preload | DMA writes block 3 | Preload |
| Layer-2 | A2[ ] as input | computer reads block 2 | Computation |
|  | W2[ ] as input | computer reads block 3 | Computation |
|  | A3[ ] as output | computer writes block 0 * | Result |
|  | //W3[ ] preload<br>//if there is a next layer | DMA writes block 1 * | Preload |

* Note that we reverse blocks 0 and 1 here to balance the storage - W[ ] array is generally much larger than activation arrays like X[ ], A1[ ], and Y[ ].

FIG. 8

|  | Block0 | Block1 | Block2 | Block3 |
|---|---|---|---|---|
| LAYER 1 Cr / Cr / Cw / Cw | $W_1$ Computation (Read) | $A_1$ Computation (Read) | $A_2$ Result (Write) | $W_2$ Preload (Write) |
| LAYER 2 Cr / Cr / Cw / Cw | $A_3$ Result (Write) | $W_3$ Preload (Write) | $A_2$ Computation (Read) | $W_2$ Computation (Read) |
| LAYER 3 Cr / Cr / Cw / Cw | $A_3$ Computation (Read) | $W_3$ Computation (Read) | $A_4$ Result (Write) | $W_4$ Preload (Write) |

FIG. 9

MEMORY APPARATUS AND METHOD FOR CONTROLLING THE SAME

CROSS-REFERENCE TO RELATED APPLICATIONS

This application is based upon and claims priority to U.S. Provisional Application No. 62/610,089, filed Dec. 22, 2017, and entitled "An Efficient SRAM Organization to Enable a Wider Single Instruction Multiple Data Machine and Software Pipelining," the entire contents thereof are incorporated herein by reference.

BACKGROUND

Deep neural network algorithms involve a large number of matrix calculations, which generally leads to a hardware architecture involving very wide single-instruction multiple-data (SIMD) processing units and large on-chip storage. Due to the nature of deep learning, different SIMD lanes need to exchange data from time to time. A number of memory architectures exist that provide cross-lane data processing and computing, but these architectures are deficient for several reasons, such as unacceptable increases in memory access latency, in bank-conflict issues, in performance issues, etc.

SUMMARY

The present disclosure provides a Static Random Access Memory (SRAM) apparatus comprised in a computational device having a SIMD architecture. Some of the example embodiments are directed towards a memory apparatus of a core. The memory apparatus comprises a first set of storage blocks configured to operate as a set of read storage blocks in a first computation layer and as a set of write blocks in a second computation layer. The second computation layer follows the first computation layer. A second set of storage blocks are configured to operate as a set of write storage blocks in the first computation layer and as a set of read storage hocks in the second computation layer.

The memory apparatus further comprises a first read port communicatively coupled to each storage block of the first and second set of storage bocks. The first read port is configured to receive operands from a first read storage block of the set of read storage blocks and to provide the received operands to at least one processing unit. The memory apparatus further comprises a second read port communicatively coupled to each storage bock of the first and second set of storage blocks. The second read port is configured to receive on or more operands form a second read storage block of the set of read storage bocks and to provide the received one or more operands to at least one processing unit. The memory apparatus additional comprises a first write port communicatively coupled to each storage block of the first and second set of storage blocks and configured to provide one or more operands to a first write storage block of the set of write storage blocks for storing.

Some of the example embodiments are directed towards a method for controlling a memory apparatus. The method comprises, for a first computational layer, selecting a first set of storage blocks to operate as a set of read storage blocks that enable providing operands to at least one processing unit via read ports of the memory apparatus and selecting a second set of storage blocks to operate as a set of write storage blocks that enable receiving operands for storage via write ports of the memory apparatus. The method further comprises, in a second computational layer that follows the first computational layer, selecting the first set or storage blocks to operate as the set of write storage blocks and selecting the second set of storage blocks to operate as the set of read storage blocks.

Some of the example embodiments are directed towards a system comprising an accelerator comprising a memory apparatus associated with at least one processing unit. The memory apparatus comprises a first set of storage blocks, a second set of storage blocks and a set of read ports each communicatively coupled to each storage block of the first and second set of storage blocks. The system further comprises a set of write ports each communicatively coupled to each storage block of the first and second set of storage blocks. The system further comprises a host unit configured to compile code into a plurality of instructions that, for a first computational layer, select the first set of storage blocks to operate a set of read storage blocks that enable providing operands to at least one processing unit via the set of read ports. The instructions also select the second set of storage blocks to operate as a set of write storage blocks that enable receiving operands for storage via the set of write ports.

The instructions further, for a second computational layer, select the first set of storage blocks to operate as the set of write storage blocks and select the second set of storage blocks to operate as the set of read storage blocks.

Some of the example embodiments are directed towards a non-transient computer readable medium that stores a set of instructions that is executable by a memory apparatus within a processing element of a neural network comprising a plurality of computational layers for executing computations. The memory apparatus comprises a first and a second read port and a first and second write port, where the first read port and the first write port are communicatively coupled to a direct memory access (DMA) unit. The memory apparatus further comprises a first, second, third and fourth storage blocks communicatively coupled to the first and second read and write ports, where the instructions cause the memory apparatus to read or write, via the first, second, third and fourth storage blocks, respectively, at most one computational value, associated with an executed computation, per computational layer.

Some of the example embodiments are directed towards a method for controlling a memory apparatus. The method comprises, for a first computational layer, operating a first set of storage hocks as a set of read storage blocks that enable providing operands to at least one processing unit via read ports of the memory apparatus and operating a second set of storage blocks as a set of write storage blocks that enable receiving operands for storage via write ports of the memory apparatus.

The method further comprises, for a second computational layer that follows from the first computational layer, operating the first set of storage blocks as the set of write storage blocks and operating the second set of storage blocks as the set of read storage blocks.

BRIEF DESCRIPTION OF THE DRAWINGS

Embodiments and various aspects of the present disclosure are illustrated in the following detailed description and the accompanying figures. Various features shown in the figures are not drawn to scale.

FIG. 8 illustrates a table featuring an exemplary method for data mapping and storage blocks classification of the SRAM apparatus of FIGS. 5-7, consistent with embodiments of the present disclosure.

FIG. 9 illustrates a flow diagram of an exemplary method for data mapping via the SRAM apparatus of FIGS. 5-8, consistent with embodiments of the present disclosure.

DETAILED DESCRIPTION

The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1A:
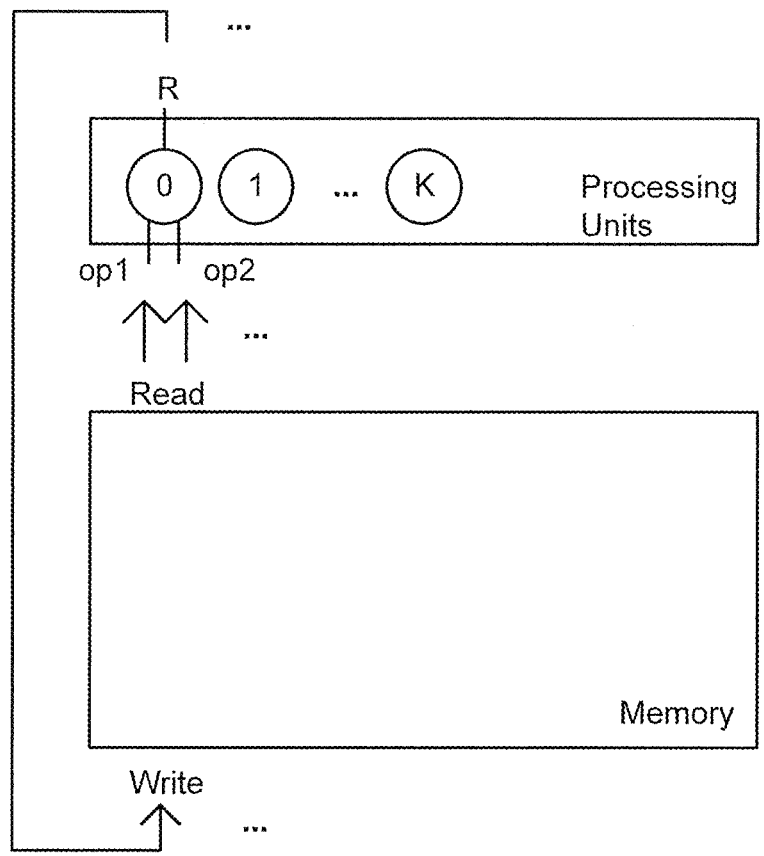
FIG. 1A is a schematic diagram illustrating an exemplary SRAM apparatus.
Figure 1B:
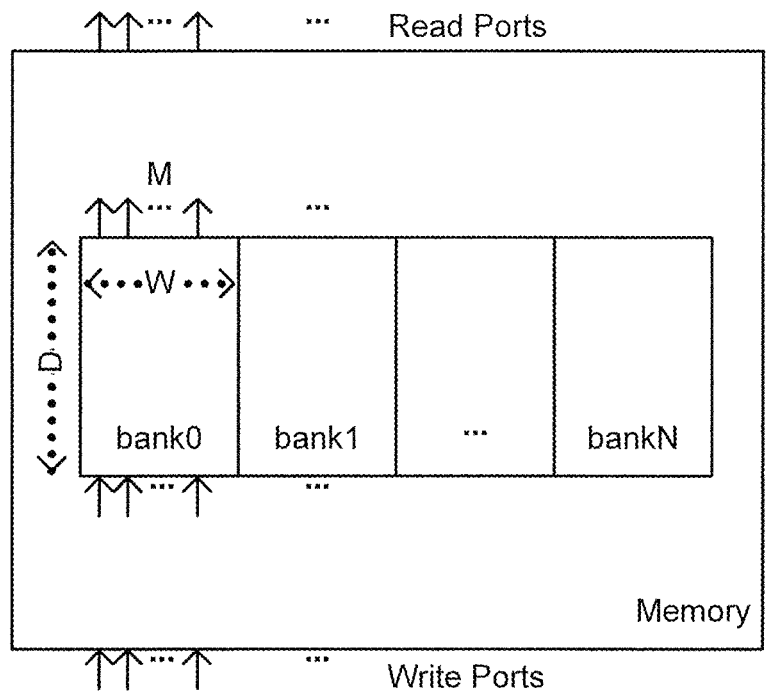
FIG. 1B is a schematic diagram illustrating exemplary bank units of the SRAM apparatus of FIG. 1A.

FIGS. 1A and 1B illustrate a block diagram of an exemplary conventional implementation of a Single Instruction Multiple Data (SIMD) architecture with 2 operands and 1 result for each compute unit. SIMD or vector architecture is very common to be used to support computes with data parallelism, such as graphics processing and deep learning. in the conventional architecture of FIG. 1A, the memory feeds two operands (e.g., 'op1' and 'op2') to one or more processing units, which perform a computation to generate a result R. When K processing units run in parallel, these K processing units consume 2K operands from the memory to generate K results during each pipelined cycle. After the K results are generated, these results can be written back into the memory.

FIG. 1B illustrates a structure of the memory of FIG. 1A. In convention systems, the memory uses 1R/1W SRAM for higher transistor density and thus smaller area, cost, and shorter latency. In such systems, a single bank of an SRAM array can include D rows with W 1-bit cells. Thus, to support a wider memory, multi-bank design is used. As shown in FIG. 1B, conventional systems can implement wide parallel access by increasing the number of banks (in this case, N banks). Each bank can potentially support M parallel reads and writes, where, M=W/data_type_width. For the K process units of FIG. 1A, in each pipeline cycle there are 2K reads (corresponding to the 2 operands for each of K process units) and K writes. Accordingly, when conventional systems use 1R/1W SRAM as the memory bank, K=M*N/2 since a single 1R/1W SRAM will be supplying each cycle two sets of operands (e.g., one set corresponding to operand op1 and the second set corresponding to operand op2), where each set of operands takes up to half of the available memory.

However, in applications requiring huge data parallelism, such as deep learning, the number of K is desired to be very large, for example 512 or 1024 processing units. There are two major issues with the conventional architectures of FIGS. 1A and 1B.

The first issue is that the number of K will be limited to a smaller number. This limitation is because there are point to point connections between the memory read ports and the output ports of each banks. Fully connected crossbar can only support a small width of ports. Even with some smarter connections with arbiter controls in between memory ports and banks, the latency of such logic adds up fast with the growth of the width of data parallelism. This growth soon stops the scaling up of a wider parallel-accessed memory because the corresponding increase in latency would become unacceptable for the pipeline design. For example, in a conventional system, an exemplary design would generally have no more than 16 banks. If each bank supports up to W=256-bit width, for a data type with 16-bits, the max possible K would be, K=[256/(16*2)]*16=128. This value of K would be considered quite small for an expected data parallelism width in deep learning.

The second issue for conventional systems involves bank conflict. When 2 or more processing units that are M/2 apart from each other and read from a same bank, an SRAM with a single-read port will not be able to supply access to both units in a same cycle. The conflicted accesses will be serialized. This serialization is unacceptable, not only because it slows down the computing program, but also complicates a simple control pattern of a SIMD machine, which expects a smooth progression of each instruction with a fixed latency. Further, the serialization also complicates the static/dynamic mechanisms for handling data dependency.

The disclosed embodiments relate to an improved memory apparatus in a neural network and a method for controlling the same. Some of the example embodiments are directed towards the organization and classification of the memory structure, which allow for a wider Single Instruction Multiple Data (SIMD) architecture and software pipelining. SIMD is a computer architecture with multiple processing units that perform the same operation on multiple data points simultaneously. Such an apparatus may be used in a neural network featuring software pipelining. Software pipelining is a technique used to optimize loops in a manner that parallels hardware pipelining. Software pipelining is a type of out-of-order execution, except that the reordering id done by a compiler instead of a processor.

The exemplary embodiments will be described herein with the use of a neural network as an example. It should be appreciated, while the embodiments provided herein are described with the use of neural networks, the example embodiments may be applied to any other system in which computations may be optimized.

Figure 2:
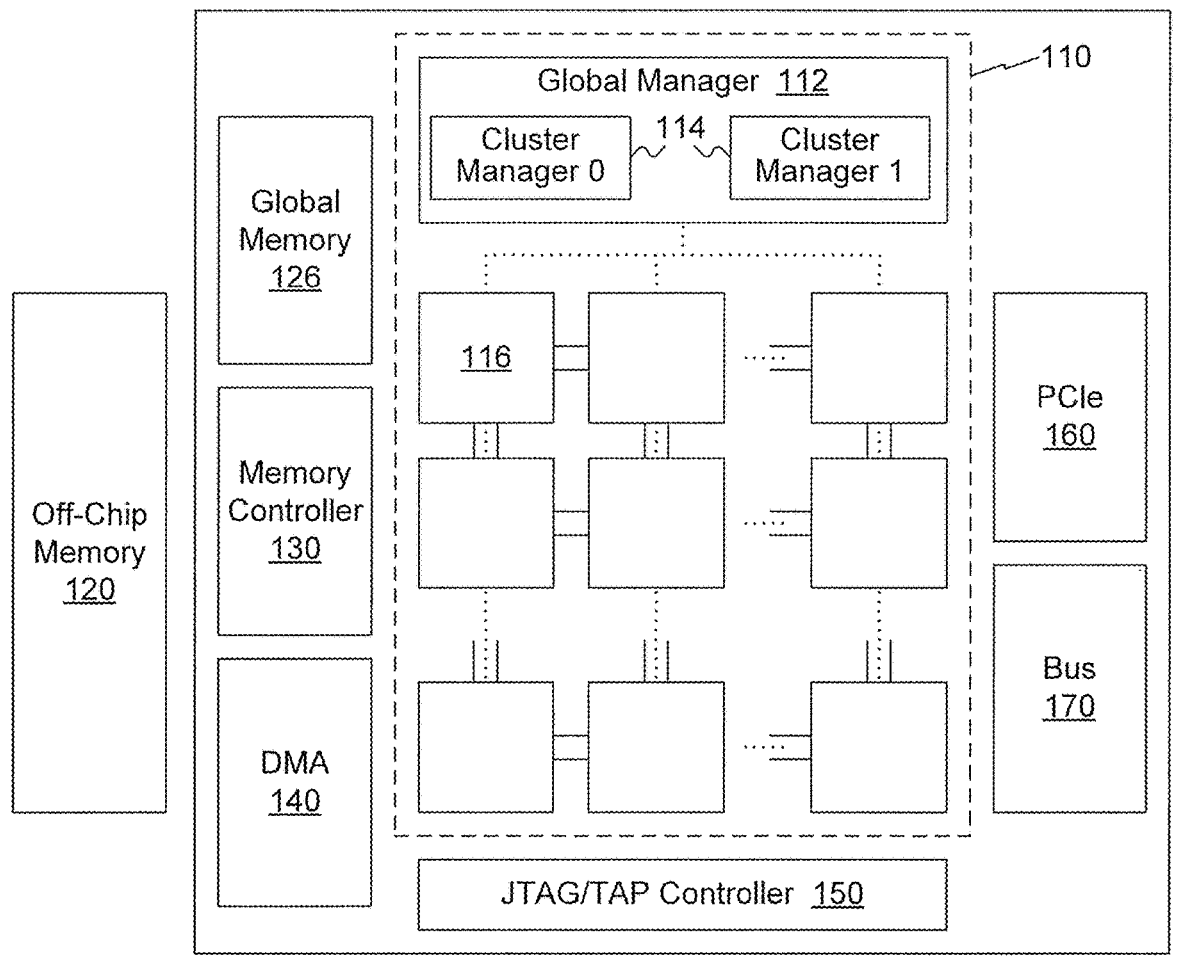
FIG. 2 is a schematic diagram illustrating an exemplary neural network processing unit (NPU) architecture, consistent with embodiments of the present disclosure.

FIG. 2 illustrates an exemplary neural network processing unit (NPU) architecture 100. NPU architecture 100 can include an on-chip communication system 110, a host memory 120, a memory controller 130, a direct memory access (DMA) unit 140, a Joint Test Action Group (JTAG)/Test Access End (TAP) controller 150, a peripheral component interconnect express (PCIe) interface 160, bus 170, a global memory 126, and the like. It is appreciated that on-chip communication system 110 can perform algorithmic operations based on communicated data. Moreover, NPU architecture 100 can include a global memory 126 having on-chip memory blocks (e.g., 4 blocks of 8 GB second generation of high bandwidth memory (HBM2)) to serve as main memory.

On-chip communication system 110 can include a global manager 112 and a plurality of cores 116. Global manager 112 can include one or more task managers 114 configured to coordinate with one or more cores 116. Each task manager 114 can be associated with an array of cores 116 that provide synapse/neuron circuitry for the neural network. For example, the top layer of cores of FIG. 2 may provide circuitry representing an input layer to neural network, while the second layer of cores may provide circuitry representing one or more hidden layers of the neural network. As shown in FIG. 2, global manager 112 can include two task managers 114 configured to coordinate with two arrays of cores 116.

Cores 116 can include one or more processing elements that each include single instruction, multiple data (SIMD) architecture including one or more processing units configured to perform one or more operations (e.g., multiplication, addition, multiply-accumulate, etc.) on the communicated data under the control of global manager 112. To perform the operation on the communicated data packets, cores 116 can include at least one buffer for storing the data packets, one or more buffers for storing instructions, one or more memories for storing information in the data packets, and one or more processing elements for processing the information in the data packets. Each processing element may comprise any number of processing units. In some embodiments, core 116 can be considered a tile or the like.

Host memory 120 can be off-chip memory such as a host CPU's memory. For example, host memory 120 can be a DDR memory (e.g., DDR SDRAM) or the like. Host memory 120 can be configured to store a large amount of data with slower access speed, compared to the on-chip memory integrated within one or more processor, acting as a higher-level cache.

Memory controller 130 can manage the reading and writing of data to and from a memory block (e.g., HBM2) within global memory 126. For example, memory controller 130 can manage read/write data coming from outside chip communication system 110 (e.g., from DMA unit 140 or a DMA unit corresponding with another NPU) or from inside chip communication system 110 (e.g., from a local memory in core 116 via a 2D mesh controlled by a task manager of global manager 112). Moreover, while one memory controller is shown in FIG. 1, it is appreciated that more than one memory controller can be provided in NPU architecture 100. For example, there can be one memory controller for each memory block (e.g., HBM2) within global memory 126.

Memory controller 130 can generate memory addresses and initiate memory read or write cycles. Memory controller 130 can contain several hardware registers that can be written and read by the one or more processors. The registers can include a memory address register, a byte-count register, one or more control registers, and other types of registers. These registers can specify some combination of the source, the destination, the direction of the transfer (reading from the input/output (I/O) device or writing to the I/O device), the size of the transfer unit, the number of bytes to transfer in one burst, and/or other typical features of memory controllers.

DMA unit 140 can assist with transferring data between host memory 120 and global memory 126. In additional, DMA unit 140 can assist with transferring data between multiple NPUs. DMA unit 140 can allow off-chip devices to access both on-chip and off-chip memory without causing a CPU interrupt. Thus, DMA unit 140 can also generate memory addresses and initiate memory read or write cycles. DMA unit 140 also can contain several hardware registers that can be written and read by the one or more processors, including a memory address register, a byte-count register, one or more control registers, and other types of registers. These registers can specify some combination of the source, the destination, the direction of the transfer (reading from the input/output (I/O) device or writing to the I/O device), the size of the transfer unit, and/or the number of bytes to transfer in one burst. It is appreciated that NPU architecture 100 can include a second DMA unit, which can be used to transfer data between other NPU architectures to allow multiple NPU architectures to communication directly without involving the host CPU.

JTAG/TAP controller 150 can specify a dedicated debug port implementing a serial communications interface (e.g., a JTAG interface) for low-overhead access to the NPU without requiring direct external access to the system address and data buses. The JTAG/TAP controller 150 can also have an on-chip test access interface (e.g., a TAP interface) that implements a protocol to access a set of test registers that present chip logic levels and device capabilities of various parts.

Peripheral interface 160 (such as a PCIe interface), if present, serves as an (and typically the) inter-chip bus, providing communication between the NPU and other devices.

Bus 170 includes both intra-chip bus and inter-chip buses. The intra-chip bus connects all internal components to one another as called for by the system architecture. While not all components are connected to every other component, all components do have some connection to other components they need to communicate with. The inter-chip bus connects the NPU with other devices, such as the off-chip memory or peripherals. Typically, if there is a PCIe interface, that is the inter-chip bus and bus 170 is solely concerned with intra-chip buses, though in some implementations is could still be concerned with specialized inter-bus communications.

While NPU architecture 100 incorporates the embodiments of the present disclosure, it is appreciated that the disclosed embodiments can be applied to any accelerator chips with architecture for accelerating some applications such as deep learning. Such chips can be, for example, GPU, CPU with vector processing ability, or neural network accelerators for deep learning. SIMD or vector architecture is commonly used to support computing devices with data parallelism, such as graphics processing and deep learning. The SIMD architecture can involve multiple processing elements, wherein each of the processing elements can perform the same operation on multiple data points simultaneously.

In some embodiments, neural network processors comprise a compiler (not shown). The compiler is a program or computer software that transforms computer code written in one programming language into NPU instructions to create an executable program. In machining applications, a compiler can perform a variety of operations, for example, pre-processing, lexical analysis, parsing, semantic analysis, conversion of input programs to an intermediate representation, code optimization, and code generation, or combinations thereof.

In some embodiments, the compiler can be on a host unit (e.g., CPU having host memory 104), which pushes commands to NPU 100. Based on these commands, task manager 1022 can assign any number of tasks to one or more cores (e.g., core 1024). Some of the commands can instruct DMA unit 108 to load instructions and data from host memory 104 into global memory 116. The loaded instructions can then be distributed to each core assigned with the corresponding task, and the one or more cores can process these instructions.

It is appreciated that the first few instructions received by the core can instruct the core to load/store data from global memory 116 into one or more local memories of the core (e.g., a memory of the core or a local memory for each active processing element of the core). Each core can then initiate the instruction pipeline, which involves fetching the instruction (e.g., via a fetch unit) from the local memory, decoding the instruction (e.g., via an instruction decoder) and generating local memory addresses (e.g., corresponding to an operand), reading the source data, executing or loading/storing operations, and then writing back results.

Figure 3A:
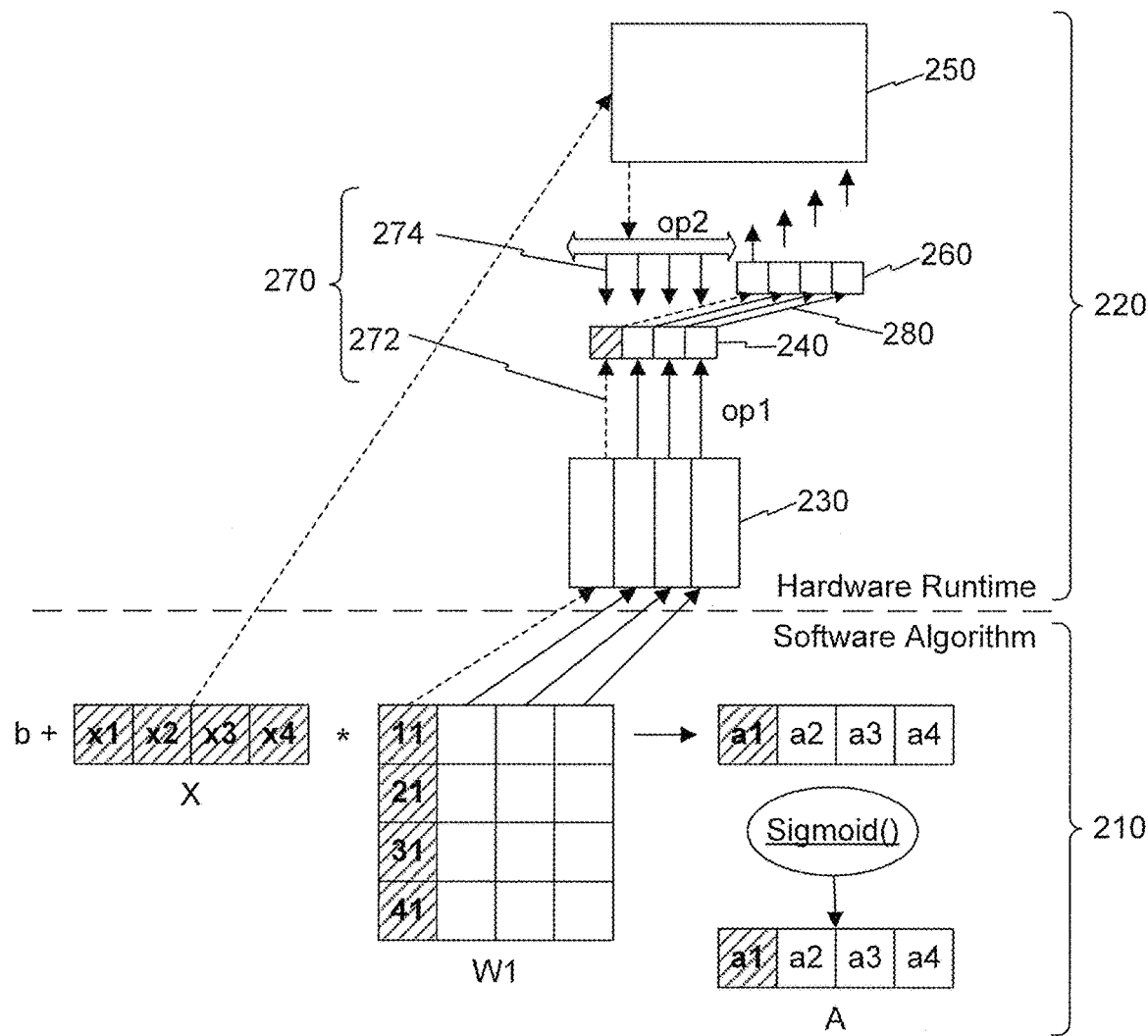
FIG. 3A is a schematic diagram illustrating an exemplary functionality of a layer of neural network processor, consistent with embodiments of the present disclosure.

FIG. 3A illustrates an exemplary functionality of a layer 200 of a neural network, including a software algorithm 210 and hardware 220. Hardware 220 can include a private memory module 230, one or more processing units of processing unit array 240, a shared (e.g., broadcast) memory module 250, a write buffer 260, input operands 270, output operand 280, and the like. In some embodiments, hardware 220 can be located in a core (e.g., core 116 of FIG. 2). It should be appreciated that a single and homogenous memory module incorporating both private and shared memory modules 230 and 250 may also be employed.

In some embodiments, a processing unit of processing unit array 240 can provide one or more operations, such as multiplication, addition, multiply-accumulate, etc. Processing unit array 240 can include multiple processing units 242, 244, 246, and 248, for example, an array of processing units, as illustrated in FIG. 3B.

Figure 3B:
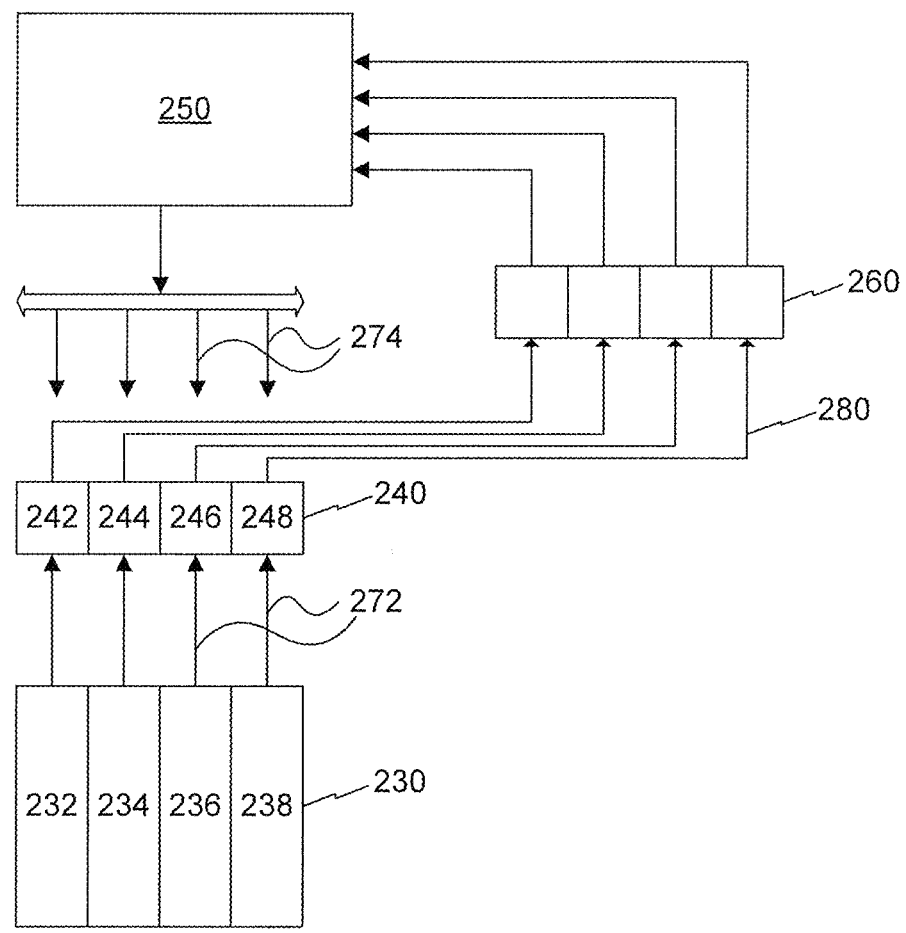
FIG. 3B is a schematic diagram illustrating an exemplary hardware neural network processor, consistent with embodiments of the present disclosure.

Private memory module 230 can be partitioned into separate private memory blocks, such that, each of the multiple processing units 242, 244, 246, and 248 has a corresponding private memory section 232, 234, 236, and 238, as shown in FIG. 3B.

Input operands 270 can be the input data operated on by processing unit array 240. In some embodiments, input operands 270 of FIG. 3A can include one or more private input operand(s) 272 and one or more shared input operand(s) 274, as shown in FIG. 3B. Private input operand 272 can be stored in private memory module 230 and shared input operand 274 can be stored in shared memory module 250.

In the application of neural networks, software algorithms 210 have shared data that can be stored in shared memory module 250 and can be broadcasted to each of the multiple processing units 242, 244, 246, and 248 of processing unit array 240 as a shared operand 274. For example, the algorithm illustrated in FIG. 3A is computing a vector operation of:

$$A=\text{sigmoid}(b+X*W1) \tag{Eq. 1}$$

which is a representative operation in layer 200 of a neural network called out often in deep learning algorithms. With reference to equation 1, "b" can include a constant value, "X" can include a shared input operand 274, and "W1" can include a private input operand 272.

With reference to FIG. 3A, the vector size can be set as any natural number. Here, a vector size of 4 is taken as an example, and a 4-way SIMD hardware to compute the vector is used. The processing units 242, 244, 246, and 248 can compute, in parallel, the following operations:

$$a1=\text{sigmoid}(b+x1*W1_{11}+x2*W1_{21}+x3*W1_{31}+x4*W1_{41}) \tag{Eq. 2}$$

$$a2=\text{sigmoid}(b+x1*W1_{12}+x2*W1_{22}+x3*W1_{32}+x4*W1_{42}) \tag{Eq. 3}$$

$$a3=\text{sigmoid}(b+x1*W1_{13}+x2*W1_{23}+x3*W1_{33}+x4*W1_{43}) \tag{Eq. 4}$$

$$a4=\text{sigmoid}(b+x1*W1_{14}+x2*W1_{24}+x3*W1_{34}+x4*W1_{44}) \tag{Eq. 5}$$

The shaded blocks and dotted lines in FIG. 3A indicate how "a1" is calculated. From this operation, it is appreciated that data in each column of the "W1" array is local to a corresponding processing unit of processing unit array 240 and the data can accordingly be stored in corresponding memory section of private memory module 230, as a private input operand 272. For example, the data in each of the first, second, third, and fourth columns of the W1 array can be stored in their corresponding memory sections 232, 234, 236, and 238 of private memory module 230 as private input operands.

With reference to FIG. 3A, the W1 array can include a matrix of stored data, wherein each element of the matrix is represented as W1ij or W1_ij (as shown later), where "i" represents the row number and "j" represents the column number in the matrix. For example, in Eq. 2, $W1_{41}$ represents the data stored in the element located at row 4 and column 1 of the W1 array. Other commonly known notations to address elements in a matrix can be used as well.

Simultaneously, data in the X-array is utilized by all processing units 242, 244, 246, and 248, and is accordingly stored in shared memory module 250, as shared input operand 274 and is broadcasted to all components reading from shared memory module 250. Equations 2-5 represent exemplary operations performed in layer 200 of a neural network processor, designed to calculate a1, a2, a3 and a4.

In some embodiments, machine learning or deep learning includes training the neural network processor to generate an end result based on input data, accomplished by implementing algorithms for one or more layers of neural processing. For example, layer 200 of FIG. 3A, represents a first layer including an algorithm configured to perform an operation using a bias b, data stored in the X array, and data stored in W1 array. A second and third layer (not shown) can include algorithms using the bias b, data stored in the X array, and data stored in W2 and W3 array. Each layer can include a different value of bias b and different parameters stored in "W" array.

With reference to FIG. 3A, for example, array X can include an individual's scores in different classes. The value of x1 of the array X can be student A's Math score, x2 can be the English score, x3 can be the History score, and x4 can be the Science score. The end result can be whether the individual will be granted admission in a school or rejected, based on the scores (input data). As shown in FIG. 3A, and described in Equations 2-5, data x1-x4 is "shared" and common in calculating a1-a4.

Figure 4:
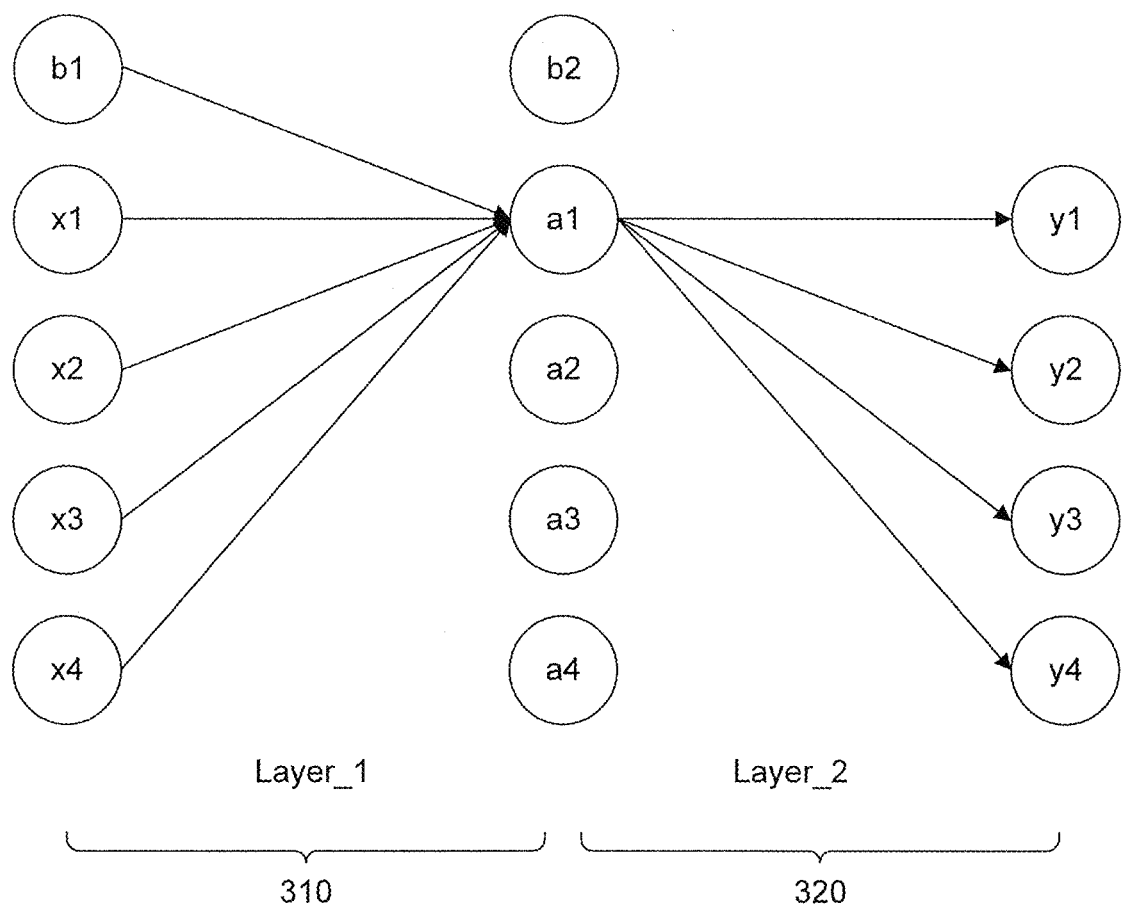
FIG. 4 is a schematic diagram illustrating exemplary data sharing in multi-layer networks, consistent with embodiments of the present disclosure.

FIG. 4 illustrates data sharing in multi-layer networks. Data sharing, as described herein, refers to how previously private data can become shared data in a later phase of a program. In some embodiments, neural network architecture 300 includes multiple layers, for example, layers 310 and 320. In some embodiments, output operand 280 of layer 310 can be used as an input operand 270 for layer 320. In some embodiments, the output operand 280 of one layer can be utilized as input operand 270 by one or more layers.

For example, in layer 310, a1 is calculated by processing unit 242 of private memory module 230. The data in a1 becomes a broadcasting input for layer 320. Generally, a neural network can be organized in layers. Each layer can perform one or more operations on its inputs and generate an output. The output of a layer can be passed onto a next layer for further processing. For example, an output of a previous layer can be an input for the next layer. Accordingly, the locally generated "a"s have to be either stored back to shared memory 250, or stored to private memory 230 and copied later to shared memory 250.

As an alternative solution to storing in private memory 230 and copying to shared memory 250 later, output operand 280 from a1 can be stored back directly to shared memory 250 than memory copying. Nevertheless, this alternative solution could still slow down the program. Since a single processing unit, for example processing unit 242, can finish only one multiply-add operation per cycle, say $Xi*W1\_ij$, each operation of "a" can be performed over multiple cycles. For this reason, only one operand of W1_ij is read out from private memory 230 in each cycle, thus only one "X" is needed from shared memory 250. Consequently, a common design of each memory module is single-read/single-write per cycle. When all "a"s are generated simultaneously by multiple processing units in the last cycle, shared memory 250 may not have the ability to write them all back.

In some embodiments, a write buffer 260 is introduced to allow shared memory 250 more time to consume these output operands 280 individually. However, when the output speed of processing unit 240 is faster than the width of write buffer 260, e.g., the size of A is greater than X, write buffer 260 may propagate a back pressure, forcing the processing unit array 240 to slow down, resulting in the slowdown of the overall program execution.

As should be appreciated from FIG. 4, in neural network algorithms, there may be multiple layers of calculations. Although a1 is calculated by an ALU, making the data in a1 appear as local data, this data may become a broadcasting input in a next computational layer. Some of the example embodiments presented herein provide a memory apparatus and method of controller the same to avoid such conflicts.

Figure 5:
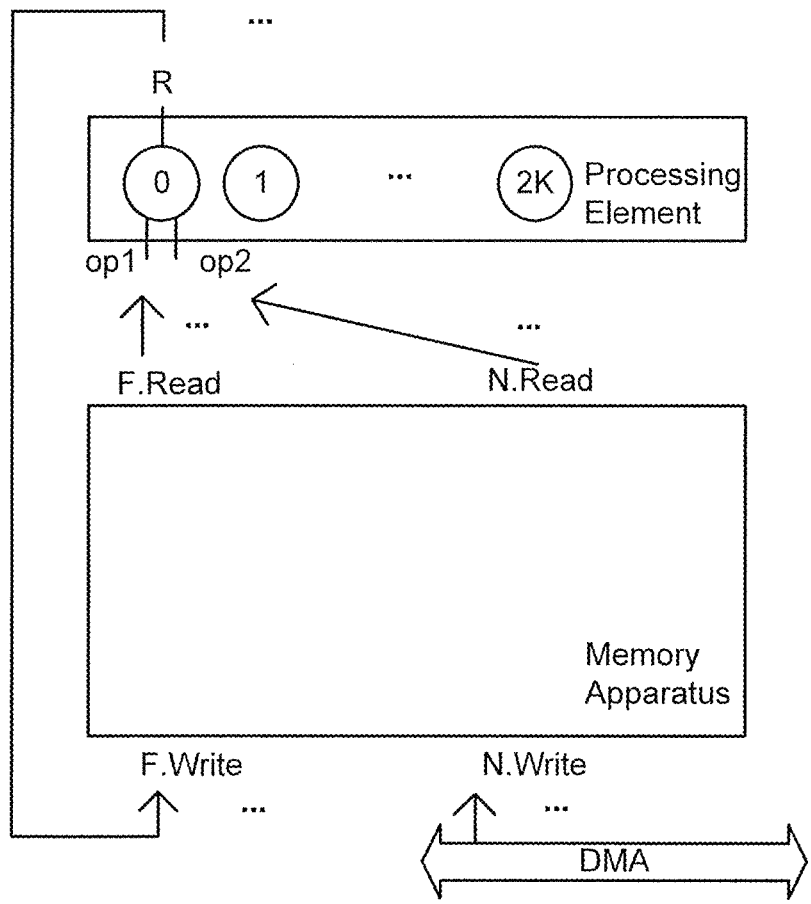
FIG. 5 is a schematic diagram illustrating an exemplary SRAM apparatus, consistent with embodiments of the present disclosure.
Figure 6:
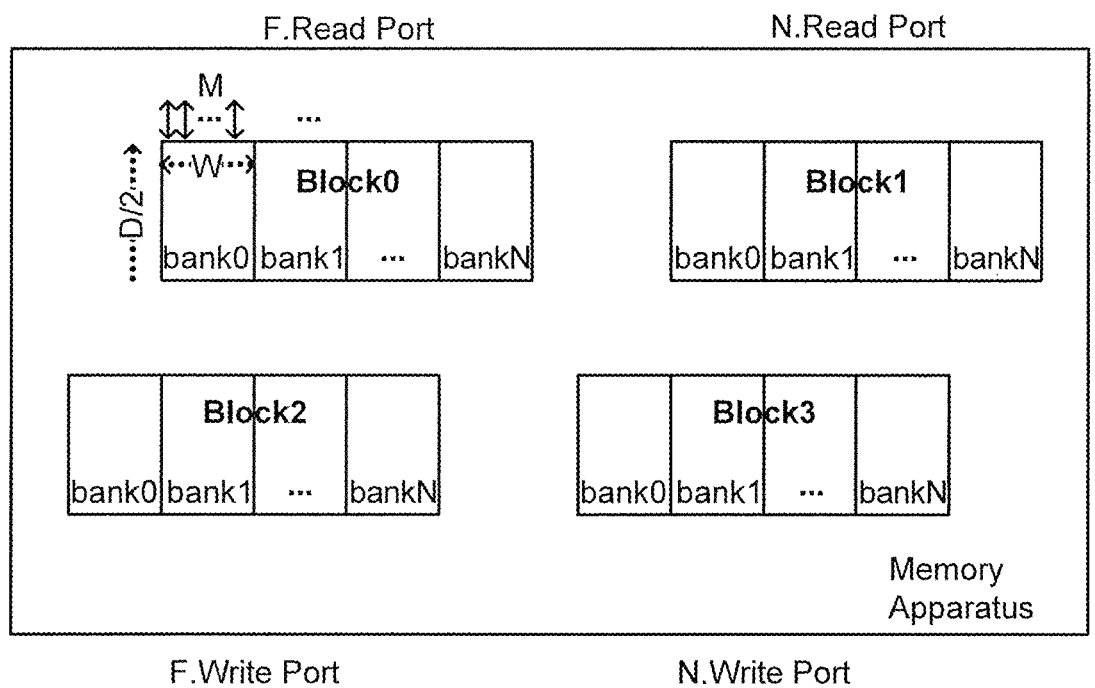
FIG. 6 is a schematic diagram illustrating exemplary storage blocks of the SRAM apparatus of FIG. 5, consistent with embodiments of the present disclosure.

FIG. 5 and FIG. 6 illustrate a memory apparatus according to some of the example embodiments. FIG. 5 illustrates a Single Instruction Multiple Data (SIMD) architecture with 2 operands, 'op1' and 'op2', and 1 result 'R' for each processing unit 0-2K of a core. The memory unit of the SIMD comprises two write ports (such as a full write port 'F.Write' and a narrow write port 'N.Write') and two read ports (such as a full read port 'F.Read' and a narrow read port 'N.Read').

FIG. 6 illustrates the structure of memory apparatus of FIG. 5. As shown in FIG. 6, the memory apparatus includes four distinct storage blocks Block0-Block3, where each storage block comprises a number of bank units bank-bankN. According to some embodiments, each storage block can be a 1R/W SRAM, which are substantially smaller and consume less power than 1R/1W SRAMs used in conventional systems. According to some of the example embodiments, each of the storage blocks of FIG. 6 is communicatively coupled to each of the write and read ports of the memory apparatus.

According to some of the example embodiments, a data mapping scheme may be utilized such that each of the storage blocks may at most read or write one set of computational values during a given computation cycle. Such organization provides a scratchpad memory implemented and organized in storage blocks. This organization efficiently avoids parallel access conflicts encountered in conventional architectures. The architecture disclosed herein not only enables a wider SIMD machine, but also enables a compiler to implement advanced optimizations such as coarse-grained software pipelining.

According to various embodiments, since a compiler may be used to control data mapping, the compiler may allocate op-1 and op-2 into blocks 0 and 1, respectively, as illustrated in FIG. 6. This architecture breaks through the physical limitations of conventional systems described in relation to FIGS. 1A and 1B. Accordingly, and as shown in FIG. 5, a 2K width of SIMD may be efficiently supported as compared with the architecture illustrated in FIG. 1A.

Figure 7:
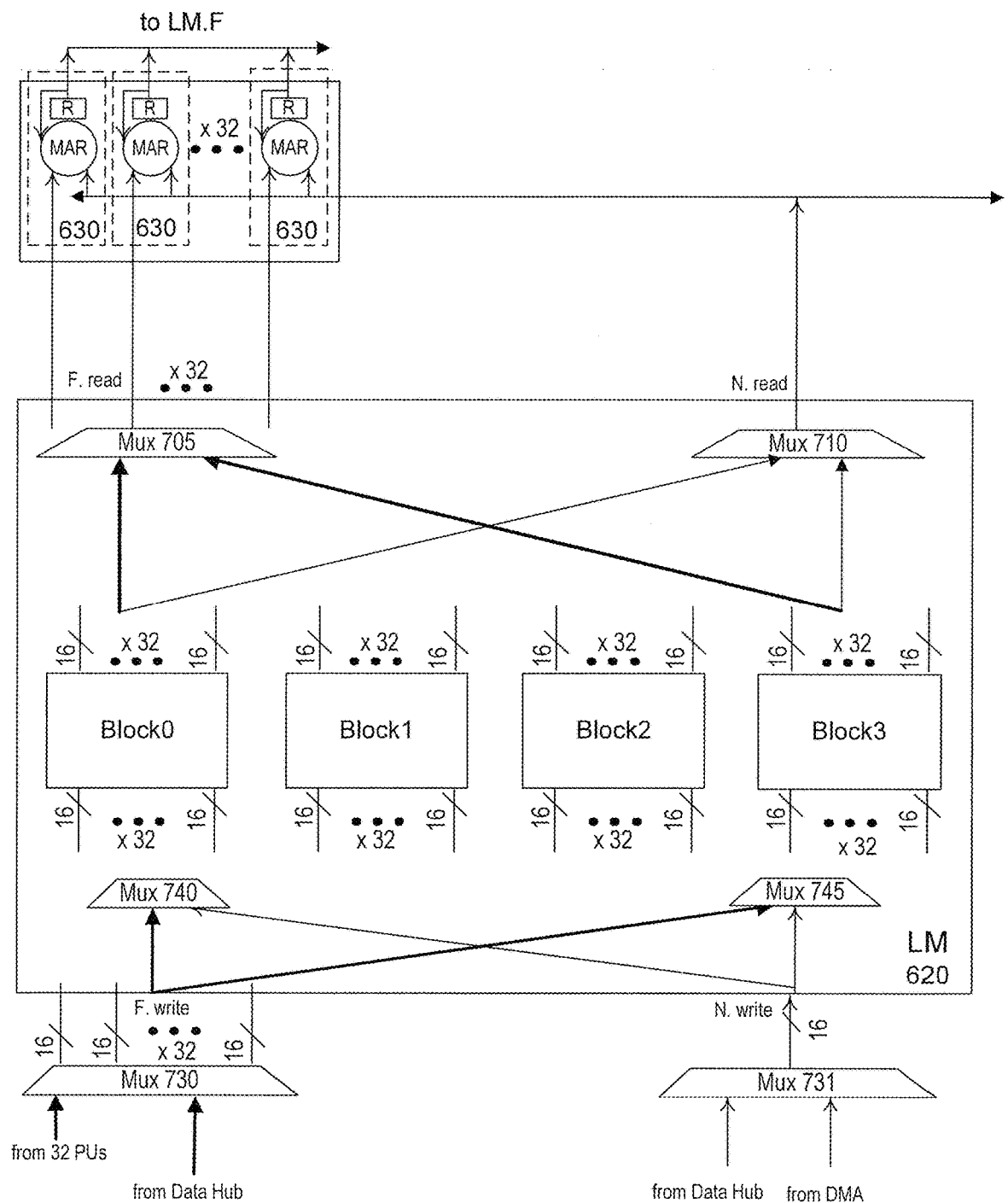
FIG. 7 illustrates a detailed schematic of the exemplary apparatus of FIGS. 5 and 6, consistent with embodiments of the present disclosure.

FIG. 7 provides a detailed schematic of an exemplary implementation of the memory apparatus of FIGS. 5 and 6, consistent with embodiments of the present disclosure. For illustrative purposes, in the embodiments shown in FIGS. 6-7, the number of processing units 630 is equal to 32 and the data width is equal to 16 bits, but it is appreciated that any number of processing units across a core and the data width can be used that are consistent with the disclosed embodiments. For example, a core may have 32 processing elements, each having 32 processing units, which amounts to 1024 processing units for the core.

For example, as shown in FIG. 7, at the lower processing-element layer, the exemplary disclosed embodiments organize 32 processing units 630 (e.g., such as a multiplier accumulator reducer (MAR) shown in FIG. 7) one of a processing element, which uses a centralized shared memory (referred to as local memory (LM) 620) for these 32 processing units 630 for data sharing. LM 620 is equivalent to the memory apparatus of FIGS. 5 and 6. According to some of the example embodiments, multiple processing elements 610 may be connected together into a system via a data hub or DMA unit. In some embodiments, the local memory of each processing element may form a distributed shared memory architecture. These local memories may be globally addressed and are electrically connected via the data hub, which provides the ability for faster sharing.

Each local memory 620 can include full ports (e.g., left two ports of local memory 620 in FIG. 7, which are associated with F.write and F.read ports involving 32 connections having 16 bits—one connection for each processing unit of the processing element) providing processing units 630 parallel access to local memory 620. Full ports can be used for SIMD access to private data, such as weights of a fully connected layer in a neural network. It is appreciated that local data stored in local memory 620 and shared directly with processing units 630 associated with the same local memory can be considered private data. Each local memory 620 can also include narrow ports (e.g., the right two ports of local memory 620 in FIG. 7, which are associated with N.write and N.read ports involving 1 connection having 16 bits) providing processing units 630 narrow access to the memory. Narrow ports can be used for broadcasting or broadcasted shared data. It is appreciated that remote data (e.g., stored in memory of another processing element or in a DMA unit) and shared with one or more other processing elements and their corresponding processing units 630 can be considered as shared data. According to some of the example embodiments, the narrow write port 'N.write' may be used to access the DMA and a data hub via a multiplexer MUX 731. It should be appreciated in FIG. 7 data communication lines illustrated in bold refer to 'full width' communication lines (e.g., 16-bit×32). Data communication lines which are not bold refer to 'narrow width' communication lines (e.g., 16 bit). It should be appreciated, narrow width communication lines may be 16, 16×2, 16×3, etc. bit. Furthermore, it should be appreciated communication line widths need not be limited to 16 bit but may also be 4 bit, 8 bit, 32 bit, etc.

Full ports and narrow ports are configured to associate with different storage blocks in local memory 620. These multiple storage blocks (e.g., storage blocks Block0 to Block3, each of which can be 1R/W SRAM) in local memory 620 are physically connected to all full and narrow ports via, for example, multiplexers (e.g., multiplexers 705, 710, 740, and 745) and can provide concurrent access to and from these ports. For instance, with respect to the read ports, there is one multiplexer for each port (e.g. multiplexer 705 for the F.read port and multiplexer 710 for the N.read port) and both are connected to each of storage blocks. For example, as shown in FIG. 7, storage blocks Block0 and Block3 are communicatively coupled to both multiplexers 705 and 710. Although not shown for purposes of simplicity, storage blocks Block1 and Block2 are coupled as well. Accordingly, for the embodiments shown in FIG. 7, multiplexers 705 and 710 may both be 4-to-1 multiplexers, where the number of inputs into a multiplexer can correspond to the number of storage blocks in local memory. For example, if there are 8 storage blocks, multiplexers 705 and 710 can both be 8-to-1 multiplexers. It is appreciated that one or more other multiplexers may exist between storage block and multiplexer 710. For example, in situations where there are 32 16-bit outputs, a 32-to-1 multiplexer may select one of the 32 inputs to provide to the N.read port. Multiplexers 705 and 710 can receive a selection signal (via compiler instructions), which selects the signal that will be output from their corresponding ports.

With respect to the write ports, each storage block has one or more corresponding 2-to-1 multiplexers that select inputs received from both F.write and N.write ports. For example, as shown in FIG. 7, multiplexers 740 and 745 can correspond to storage blocks Block0 and Block3, respectively. Based on the selection signal (via compiler instructions), multiplexers 740 and 745 can provide to their corresponding storage blocks selected data received via the full write port or the narrow write port. Although not shown for purposes of simplicity, similar multiplexers can be used to write data to storage blocks Block1 and Block2. In some embodiments, in situations where data is being written to a storage block, there may be 32 2-to-1 multiplexers (one for each of the 32 16-bit inputs) that selects one of the 16-bit inputs received from either the F.write or N.write ports. The configuration of these connections between storage blocks Block0-Block3 and the ports can be established based on instructions received by the core.

For instance, a sequence of SIMD instructions running in one or more cores may involve all 32 processing units 630 of each of the 32 processing elements to perform the calculation of Aout[1024]=W1[1024]*Ain[1].

To simplify this calculation for the components of FIG. 7 where there are 32 processing units, the components can perform the calculation of Aout[32]=W1[32]*Ain[1]. In this example, storage blocks Block0-Block3 can be used to store data with Block0 storing data W1[32] and Block1 storing data Ain[1] received via a back-staged control sequence via DMA unit. As will be further described later, the 32 processing units can receive the Ain operand and one of the W1 operands and perform a corresponding operation to generate result Aout[32], which can be provided back to local memory 620 via mux 730 and full write port.

The design of each storage block Block0-Block3 can be implemented using one 1 R/W SRAM (with each storage block serving either as one Read storage block or one Write storage block that cycle) instead of 1R/1W SRAM (can serve one READ and one WRITE), leading to ~30% silicon area reduction and power savings. In this example, storage block Block0-Block3 have identical functionality and can be configured to serve as either a read or write storage block per cycle based on software. That is, any type of data (whether it be private or shared) can be stored in any storage block as long as it satisfies that there are only one data flow through one dedicated storage block via one port for any given cycle—although all storage blocks are physically connected to all ports so as to avoid data conflict. Moreover, it is appreciated that other storage blocks may exist and may be idle depending on the clock cycle.

According to various embodiments, a compiler can establish address alignment in each block access, in order to avoid bank conflicts between data lanes. In contrast with conventional architectures, the memory apparatus of FIGS. 5-7 allowing the compiler to avoid bank conflicts by providing means of allowing the various storage banks to operate on at most one computational value (e.g., a computational result or operand to be used in a current or next computational cycle) per computational cycle. In conventional systems op-1 and op-2 cause a conflict if a same bank is utilized for storing both operands. Allocating op-1 and op-2 into a same block may lead to unaligned addresses, which in turn causes bank conflict from different data lanes of the same operand (op-1 or op-2). According to the embodiments provided herein, operands are allocated to different storage blocks. Specifically, at any given computational layer, a storage block may at most read or write one computational value.

FIG. 8 illustrates a table providing an example of data mapping and operational modes that may be provided by the storage blocks of FIGS. 5-7. FIG. 9 is a schematic showing the functionality of various storage blocks of FIG. 6 during multiple layers of computation. The first two computational layers of FIG. 9 correspond to the example layers provided in the table of FIG. 8.

As illustrated in FIG. 9, each computational layer may comprise any number of cycles. In the example provided in FIGS. 8 and 9, each computational layer includes at least two cycles (labeled Cr and Cw in FIG. 9). Specifically, each computational layer comprises at least one read cycle Cr and at least one write cycle Cw. According to some of the example embodiments, at the start of each computational layer, the compiler may provide instructions to the memory apparatus regarding the functionality or operational mode of the various storage blocks.

In the example provided in FIGS. 8 and 9, at cycle Cr of layer 1, storage block Block1 is assigned a computation operational mode. In a computation operational mode, a storage block may be configured to acquire an operand to be used in a computation to be executed for current computational layer. In the present example, Block1 reads a first operand ($A_1$).

During cycle Cr, Block0 is assigned a computation operational mode and is therefore configured to acquire an array of operands to be used in the computation of the current computation layer. In the example provided by FIGS. 8 and 9, Block0 retrieves array $W_1$ having a set of operands.

Once all the operands have been obtained, the processing units can perform the computation. For example, as shown in FIG. 7, a processing unit (MAR) may be configured to receive the first operand ($A_1$) and one of the operands from array $W_1$, from Block1 and Block0, respectively, via the F.Read and N.Read ports of the memory apparatus. For example, storage block Block0 may have 32 operands in array $W_1$, all of which are output to the full read port. Each of these operands of array $W_1$ are provided to separate processing units for computation. Moreover, first operand $A_1$ stored in storage block Block1 can be output to narrow read port. First operand $A_1$ can be provided to each of the processing units for computing with the respective operand from array $W_1$ to generate the result $A_2[32]=W_1[32]*A_1[1]$.

During the write cycle Cw, Block2 is assigned a result operational mode. During a result operational mode, a storage block is configured store a result of the computation (e.g., $A_2$), within the current computational layer, involving the first and second operand. The result will be provided via a processing unit of the processing element through the F.Write port (via multiplexer 730). Block2 can store one or more resulting operands of the computation, $A_2$, within a bank of storage block Block2. For example, while a single operand from the result $A_2[32]$ can be stored in Block2 (via select signal at multiplexer 730), it is appreciated that all operands from the result of $A_2[32]$ can be stored.

Also during the write cycle Cw, Block3 is assigned a preload operational mode. During a preload operational mode, a storage block is configured to retrieve operands for $W_2$ array to be used during computations of the next computational layer. According to some of the example embodiments, the preloaded operands may be retrieved from the DMA via the narrow write port of the memory apparatus. In the example provided by FIGS. 8 and 9, a preload array, W2, is retrieved from DMA and stored within a bank unit of storage block Block3.

During the next computational layer, layer 2, the two values written into the storage blocks from the previous layer are utilized. Specifically, the result from layer 1, $A_2[32]$, is used as a first operand in layer 2 and the preloaded operand, $W_2$ array, is used as the second operand. Thus, the operational mode of storage blocks Block2 and Block3 are dynamically adjusted to the computation operational mode at the start of layer 2. The first and second operand, $A_2[32]$ and W2 array, are read from a bank unit of storage blocks Block2 and Block3 during the read cycle Cr of layer 2.

As the operands to be used in computational layer 2 are already provided in the storage blocks, a processing element of the processing element is able perform the computation promptly. The first and second operand, $A_2[32]$ and $W_2$ array, will be retrieved from storage blocks Block2 and Block3, respectively, via the F.Read and N.Read ports of the memory apparatus.

During the write cycle Cw of computational layer 2, storage block Block0 is assigned the result operational mode. Thus, the result is provided via a processing unit of the processing element through the full write or narrow write port to storage block Block0. Storage block Block0 will store the result of the computation, $A_3$, within a bank of storage block Block0.

Also during the write cycle Cw of layer 2, Block1 is assigned a preload operational mode. According to some of the example embodiments, the preloaded operand may be retrieved from the DMA via the narrow write ports of the memory apparatus. In the example provided by FIGS. 8 and 9, a preload operand, $W_3$, is retrieved from DMA via the narrow write port and stored within a bank unit of storage block Block1.

As was the case for layer 2, during the next computational layer, layer 3, the two values written into the storage blocks from the previous layer are utilized. Specifically, the result from layer 2, $A_3$, is used as a first operand in layer 3 and the preloaded operand, $W_3$, is used as the second operand. Thus, the operational mode of storage blocks Block0 and Block1 are dynamically adjusted to the computation operational mode at the start of layer 3. The first and second operand, $A_3$ and $W_3$, are read from a bank unit of storage blocks Block0 and Block1 during read cycles Cr of layer 3.

Thereafter, a processing element of the processing element will perform the computation. The first and second operand, $A_3$ and $W_3$, will be retrieved from storage blocks Block0 and Block1, respectively, via the F.Read and N.Read ports of the memory apparatus.

During the write cycle Cw of layer 3, storage block Block2 is assigned the result operational mode. Thus, the result is provided via a processing unit of the processing element through the F.Write port, via multiplexer 730, to storage block Block2. Storage block Block2 will store the result of the computation, $A_4$, within a bank of storage block Block2.

Also during the write cycle Cw of layer 3, Block3 is assigned a preload operational mode. Thus, a preload operand, $W_4$, is retrieved from DMA and stored within a bank unit of storage block Block3. The preload operand stored during this cycle will be used as an operand during the next computational layer.

According to some of the example embodiments the reads and writes performed during the read cycle Cr and write cycle Cw, respectively, may occur simultaneously or sequentially within the computational layer. It should be appreciated, in the example provided by FIGS. 8 and 9, the storage blocks alternate operational modes focused on reading (e.g., the computation mode) and writing (e.g., the result and preload modes).

It should be appreciated the steps that occur in respective computational layers may be performed in any number of cycles. For example, according to some of the example embodiments, operations involving the reading of operands (e.g., by a storage blocks in a computational mode) may occur in a same cycle. Furthermore, the writing of the preload operand may occur in the same cycle as the reading of the operands, in a same cycle as the writing of the computational result (e.g., by a storage in the result mode) or in a different or separate cycle.

According to some of the example embodiments, in addition to dynamically altering the operational modes of the various storage blocks, the types of data accessible by the storage block may also be altered. For example, the storage block assigned to read operands from the DMA (in the example assigned with the label W) may be altered. Different types of operands may be larger in size compared to others. Thus, altering storage blocks, with respect to the types of data the blocks are receiving and from which source, may assist in balancing the storage demands of the individual blocks.

In the example provided by FIGS. 8 and 9, a storage block that is assigned the result mode in one computational layer, is assigned the computation mode in the next computational layer. As the result of the computation is stored within a bank unit of the storage block in the result mode, an additional data retrieval may be eliminated. Specifically, once the same storage block is transitioned to a computation mode during the next computational layer the operand, which was the result in the previous computational layer, is already stored within a bank unit of the storage block. Therefore, by providing a constant transition of result and computation modes, the processing speed of the neural network may be improved.

Additionally, with the use of the preload operational mode, the processing speed of the neural network may also be increased. The preloading of the operand allows for the computation to be performed immediately at the start of the new computational layer. Specifically, at the start of each computational layer, the two operands needed for the computation are already present in the storage blocks via the transition of the result and computation modes and the use of preloading.

Figure 10:
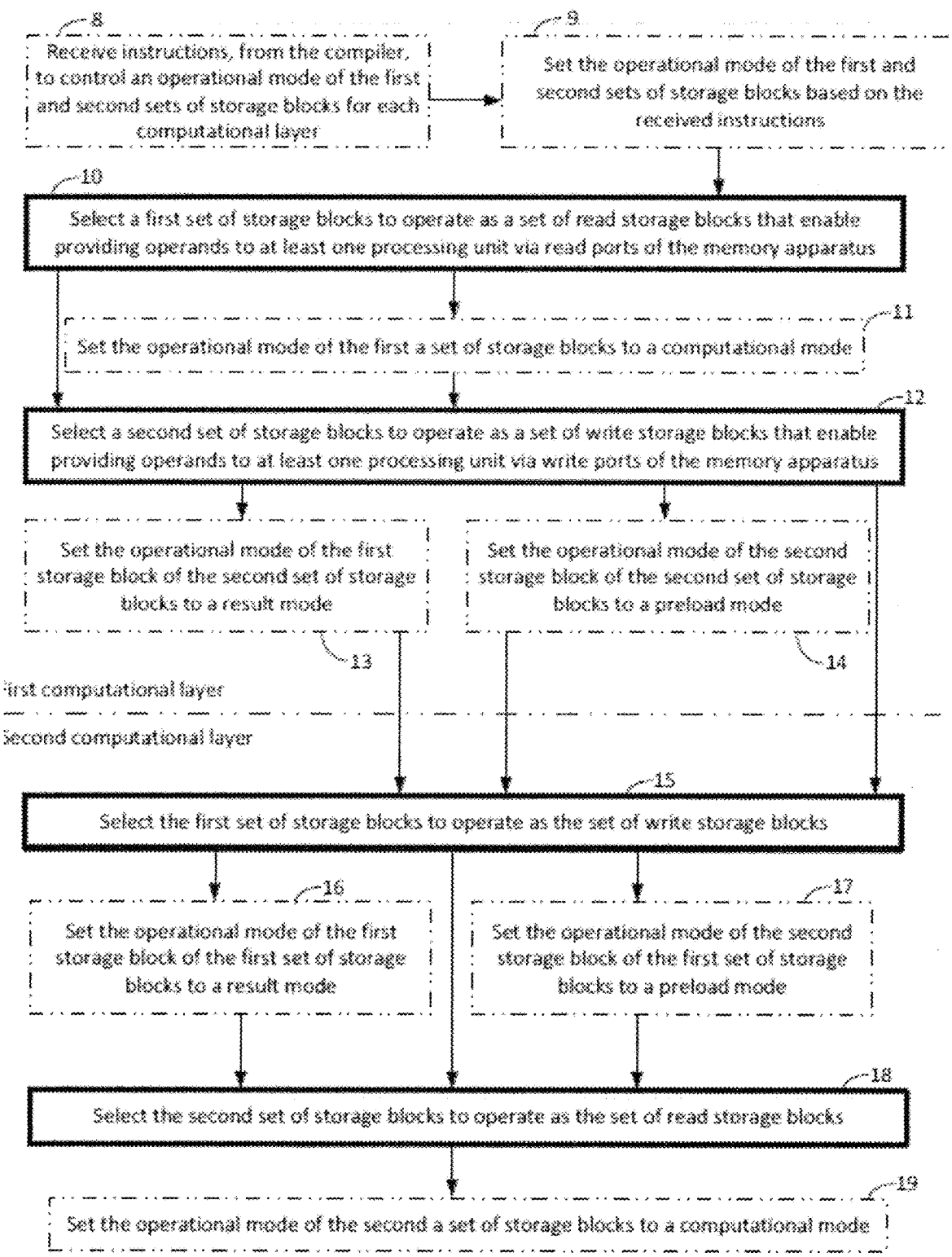
FIG. 10 is a flow diagram depicting example operations which may be performed by the memory apparatus of FIGS. 5-8.

FIG. 10 is a flow diagram depicting example operations which may be taken by the memory apparatus of FIG. 5-9. It should be appreciated that FIG. 10 comprises some operations that are illustrated with a solid border and some operations which are illustrated with a dashed border. The operations which are comprised in a solid border are operations that are comprised in the broadest example embodiment. The operations that are comprised in the dashed border are example embodiments that may be comprised in, or a part of, or are further operations that may be taken in addition to the operations of the border example embodiments. It should be appreciated that these operations need not be performed in order. Furthermore, it should be appreciated that not all of the operations need to be performed. The example operations may be performed in any order and in any combination.

The example operations of FIG. 10 will be described with the use of the example provided in FIGS. 8 and 9, where the memory apparatus comprises at least four storage memory blocks. Example operations 8-14 of FIG. 10 take place within the first computational layer (layer 1 as illustrated in FIG. 9). Example operations 15-19 take place in the second computational layer (layer 2 as illustrated in FIG. 9).

The blocks labeled as Block0 and Block1 are comprised in a first set of storage blocks and the blocks labeled as Block2 and Block3 are comprised in a second set of storage blocks. As shown in the example provided in FIGS. 8 and 9, the first set of storage blocks are initially (e.g., during the first computational layer) configured to read operands from memory and the second set of storage blocks are initially configured to write operands into memory. During the second computational layer, the operations of the first and second set of storage blocks are switched such that the first set of storage blocks are configured to operate in write based modes while the second set of storage blocks are configured to operate in read based modes.

Some of the example embodiments may comprise receiving instructions in step 8, from a compiler, to control an operational mode of the first and second sets of storage blocks for each computational layer. According to some of the example embodiments, the instructions may be provided by the compiler, via the host unit, to the memory apparatus. The instructions may be received, for example, at the start of every computational cycle or during any predetermined time interval.

After receiving the instructions in step 8, some of the example embodiments further comprise setting the operational mode of the first and second sets of storage blocks based on the received instructions (step 9). Thus, the operational modes of the storage blocks may be dynamically adjusted at the start of each computational layer. For example, as depicted in FIG. 9, the operational blocks may alternate from a write-based mode to a read-based mode during successive computational layers.

Some of the example embodiments comprise, in step 10, selecting, in a first computational layer, a first set of storage blocks to operate as a set of read-storage blocks that enable providing operands to at least one processing unit via read ports of the memory apparatus. In the example provided by FIG. 9, storage blocks Block0 and Block1 are both set to a read mode. According to some of the example embodiments, the selecting at step 10 may further comprise step 11, which involves setting the operational mode of the first set of storage blocks to a computational operational mode such that the first set of storage blocks are configured to read operands to be used in a computation (via at least one processing unit) and to be executed in the first computational layer. As shown in FIG. 9 storage blocks Block0 and Block1 are both in the computational mode such that the blocks are configured to read operands from inputs $W_1$ and $A_1$, respectively, for the computation to be performed in layer 1. According to some of the example embodiments, the reading may be performed via the full read or narrow read ports, as described in conjunction with FIG. 7.

Some of the example embodiments may comprise step 12, which involves selecting a second set of storage blocks to operate as a set of write storage blocks that enable receiving operands for storage via write ports of the memory apparatus. As shown in FIG. 9, the storage blocks Block2 and Block3 are provided in write-based modes during layer 1.

Specifically, storage blocks Block2 and Block3 are configured to write the result of the computation $A_2$ and a preload operation for $W_2$, respectively, within the bank units storage block itself. For example, each bank unit of a storage block may store one or more operands, such as each operand of the $W_2$ input array may be stored in a separate bank.

According to some of the example embodiments, the selecting of step 12 further comprises setting the first storage block (step 13) of the second set of storage blocks, to a result mode such that the first storage block is configured to write, within the first storage block, a result of the executed computation in the first computational layer. As shown in FIG. 9, the first storage block of the second set of storage blocks is denoted as Block2. Block2 is configured to write the result $A_2$ from a computation involving the operands from inputs $W_1$ and $A_1$. As illustrated in FIG. 7, upon computation via the at least processing unit, the result of the computation may be provided to the first storage block via a feedback connection between the processing units and the full write port F.write.

Some of the example embodiments may further comprise setting the operational mode of the second storage block in the second set of storage blocks to a preload mode (in step 14). Under such a mode, the second storage block is configured to write a preload operand, within the second storage block, to be used in a computation to be executed in the second computational layer. As shown in FIG. 9, the second storage block of the second set of storage blocks is denoted as Block3. Block3 is configured to write operands of input $W_2$ into bank units of Block3. The operands from $W_2$ input array are operands to be used during layer 2. Thus, these operands can be preloaded during layer 1. Such preloading allows the computation of computational layer 2 to occur immediately without the need of having multiple memory reads at the start of computational layer 2. As illustrated in FIG. 7, the second storage block may write the preload operand from DMA via the narrow write port, N.write.

Some of the example embodiments comprise at the start of the second computational layer step 15, which involves selecting the first set of storage blocks to operate as the set of write storage blocks. As shown in FIG. 9, the first set of storage blocks, denoted as Block0 and Block1, were initially placed in read-based modes in layer 1 and thereafter are placed in write-based modes in computational layer 2.

According to some of the example embodiments, the selecting of step 15 may further comprise setting the operational mode of the first storage block of the first set of storage blocks to the result mode at step 16. When set to operate under the operational mode, the first storage block is configured to write, within the first storage block, a result of an executed computation in the second computational layer. As shown in FIG. 9, the first storage block of the first set of storage blocks is denoted as Block0. During the start of the second computational layer, layer 2, Block0 is configured to write one or more operands of result $A_3$ of the computation of layer 2. As illustrated in FIG. 7, upon computation via the at least processing unit, the result of the computation may be provided to the first storage block via a feedback connection between the processing units and the full write port F.write.

According to some of the example embodiments, the selecting of step 15 may further comprise setting the operational mode of the second storage block of the first set of storage blocks to the preload mode at step 17. Operating under such a mode, the second storage block is configured to write, within the second storage block, a preload operand to be used in the computation to be executed in third computational layer. As shown in FIG. 9, the second storage block of the first set of storage blocks is denoted as Block1. During the start of the second computational layer, Block1 is configured to write the preload operands of $W_3$ array within one or more bank units of Block1. For example, each bank unit of a storage block may store one or more operands, such as each operand of the $W_3$ input array may be stored in a separate bank. As illustrated in FIG. 7, the second storage block may write the preload operand from DMA via either the narrow write port, N.write.

Some of the example embodiments may further comprise step 18, which involves selecting the second set of storage blocks to operate as the set of read storage blocks. As shown in FIG. 9, the second set of storage blocks, denoted as Block2 and Block3, are initially (e.g., in computational layer 1) placed in a write-based mode. In the start of the second computational layer, the second set of storage blocks, Block2 and Block3, are placed in read-based modes.

According to some of the example embodiments, the selecting of step 18 may further comprise setting the operational mode of the second set of storage blocks to the computation mode at step 19. Operating under such a mode, the second set of storage blocks are configured to read operands to be used in the computation to be executed in the second computational layer. As shown in FIG. 9, the second set of storage blocks, denoted as Block2 and Block3, are initially (e.g., within computational layer 1) configured to write operands into their respective bank units. At the start of the second computational layer, Block2 and Block3 are placed in the computational mode and immediately provide the operands (which were written in layer 1, operands of inputs $A_2$ and $W_2$) to the at least one processing unit to perform the computation to be executed within the second computational layer. Thus, by alternating the modes of the storage blocks from write to read based modes, computational speeds may be increased as the operands needed to execute the computation are already stored within the storage blocks.

The various example embodiments described herein are described in the general context of method steps or processes, which may be implemented in one aspect by a computer program product, embodied in a computer-readable medium, including computer-executable instructions, such as program code, executed by computers in networked environments. For example, it is appreciated that the instructions may cause the sending of a distribution indication to the centralized data hub, which can distribute shared data according a distribution pattern affiliated with the distribution indication. A computer-readable medium may include removeable and nonremovable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A memory apparatus of at least one core, the memory apparatus comprising:
   a first set of storage blocks configured to operate as a set of read storage blocks in a first computation layer and as a set of write storage blocks in a second computation layer, wherein the second computation layer follows the first computation layer;
   a second set of storage blocks configured to operate as a set of write storage blocks in the first computation layer and as a set of read storage blocks in the second computation layer;
   a first read port communicatively coupled to each storage block of the first and second set of storage blocks and configured to receive operands from a first read storage block of the set of read storage blocks and to provide the received operands to at least one processing unit of the at least one core;
   a second read port communicatively coupled to each storage block of the first and second set of storage blocks and configured to receive one or more operands from a second read storage block of the set of read storage blocks and to provide the received one or more operands to the at least one processing unit of the at least one core; and a first write port communicatively coupled to each storage block of the first and second set of storage blocks and configured to provide one or more operands to a first write storage block of the set of write storage blocks for storing.

2. The memory apparatus of claim 1, further comprising:
a second write port communicatively coupled to each storage block of the first and second set of storage blocks and configured to provide operands to a second write storage block of the set of write storage blocks for storing.

3. The memory apparatus of claim 1, wherein the first set of storage blocks includes first and second storage blocks and, within the first computational layer:
first and second storage blocks of the first set of storage blocks are configured to operate in a computational mode such that the first and second storage blocks of the first set of storage blocks are configured to read, to the at least one processing unit via the first and second read ports, respectively, the operands to be used in a computation to be executed in the first computational layer.

4. The memory apparatus of claim 1, wherein the second set of storage blocks includes a first storage block and a second storage block and within the first computational layer:
the first storage block of the second set of storage blocks is configured to operate in a result mode such the first storage block of the second set of storage blocks is configured to write, within the first storage block, a result of the executed computation in the first computational layer.

5. The memory apparatus of claim 2, wherein within the first computational layer:
the second storage block, of the first set of storage blocks, is configured to operate in a preload mode such that the second storage block is configured to write, within the second storage block, a preload operand to be used in a computation to be executed in a second computational layer.

6. The memory apparatus of claim 3, wherein at least one of the computational mode, the result mode and the preload mode are dynamically assigned to the first and second storage blocks of the first and second set of storage blocks, at the beginning of each computational layer.

7. The memory apparatus of claim 3, wherein during the second computational layer:
the second set of storage blocks are configured to operate in the computational mode such that the second set of storage blocks are configured to read operands, which were written by the second set of storage blocks within the first computational layer, to the at least one processing unit to execute a computation of the second computational layer.

8. The memory apparatus of claim 3, wherein during the second computational layer:
the first storage block, of the first set of storage blocks, is configured to operate in the result mode such that the first storage block is configured to write, within the first storage block, a result of an executed computation in the second computational layer.

9. The memory apparatus of claim 3, wherein during the second computational layer:

the second storage block, of the first set of storage blocks, is configured to operate in a preload mode such that the second storage block is configured to write a preload operand within the second storage block, wherein the preload operand is to be used in a computation to be executed in a third computational layer.

10. The memory apparatus of claim 1, wherein each storage block of the first and second set of storage blocks are a single read/write Static Random Access Memory (1R/W SRAM).

11. The memory apparatus of claim 2, wherein each storage block of the first and second set of storage blocks are communicatively coupled to the first and second write ports via a respective N-to-1 multiplexer and are communicatively coupled to the first and second read ports via a respective M-to-1 multiplexer, where N is the number of storage blocks within the memory apparatus and M is the number of write ports in the memory apparatus.

12. The memory apparatus of claim 1, wherein the core includes a Single Instruction Multiple Data (SIMD) architecture.

13. A method for controlling a memory apparatus, the method comprising:
for a first computational layer:
selecting a first set of storage blocks to operate as a set of read storage blocks that enable providing operands to at least one processing unit via read ports of the memory apparatus, and
selecting a second set of storage blocks to operate as a set of write storage blocks that enable receiving operands for storage via write ports of the memory apparatus; and
in a second computational layer that follows the first computational layer:
selecting the first set of storage blocks to operate as the set of write storage blocks, and
selecting the second set of storage blocks to operate as the set of read storage blocks.

14. The method of claim 13, further comprising
generating instructions to control an operational mode of the first and second sets of storage blocks of the memory apparatus for each computational layer, wherein the instructions set the operational mode of the first and second sets of storage blocks.

15. The method of claim 14, wherein the instructions further set the operational mode of the first and second sets of the storage blocks dynamically at the start of each computational layer.

16. The method of claim 14, wherein the instructions for setting the operational mode further comprises:
setting the operational mode of the first set of storage blocks to a computational mode such that the first set of storage blocks are configured to read, operands to be used in a computation, via the at least one processing unit, to be executed in the first computational layer.

17. The method of claim 14, wherein the second set of storage blocks comprises a first storage block and a second storage block, and wherein the instructions for setting the operational mode further comprises:
setting the operational mode of a first storage block, of the second set of storage blocks, to a result mode such that the first storage block is configured to write, within the first storage block, a result of the executed computation in the first computational layer.

18. The method of claim 14, wherein the first set of storage blocks comprises a first storage block and a second storage block, and wherein the instructions for setting the operational mode further comprises:

setting the operational mode of a second storage block, in the first set of storage blocks, to a preload mode such that the second storage block is configured to write a preload operand, within the second storage block, to be used in a computation to be executed in the second computational layer.

19. The method of claim 14, wherein instructions for setting the operational mode further comprises:

setting the second set of storage blocks to operate in the computational mode such that the second set of storage blocks are configured to read operands, which were written by the second set of storage blocks within the first computational layer, to the at least one processing unit to execute a computation of the second computational layer.

20. The method of claim 14, wherein instructions for setting the operational mode further comprises:

setting the operational mode of the first storage block, of the first set of storage blocks, to the result mode such that the first storage block is configured to write, within the first storage block, a result of an executed computation in the second computational layer.

21. The method of claim 14, wherein instructions for setting the operational mode further comprises:

setting the operational mode of the second storage block, of the first set of storage blocks, to the preload mode such that the second storage block is configured to write, within the second storage block, a preload operand to be used in the computation to be executed in the third computational layer.

22. A system comprising:

an accelerator comprising a memory apparatus associated with a at least one processing unit, the memory apparatus comprising:
  a first set of storage blocks,
  a second set of storage blocks,
  a set of read ports each communicatively coupled to each storage block of the first and second set of storage blocks, and
  a set of write ports each communicatively coupled to each storage block of the first and second set of storage blocks; and a host unit configured to compile computer code into a plurality of instructions that:
  for a first computational layer:
    select the first set of storage blocks to operate as a set of read storage blocks that enable providing operands to the at least one processing unit via the set of read ports, and
    select the second set of storage blocks to operate as a set of write storage blocks that enable receiving operands for storage via the set of write ports; and
  for a second computational layer that follows the first computation layer:
    select the first set of storage blocks to operate as the set of write storage blocks, and
    select the second set of storage blocks to operate as the set of read storage blocks.

23. A non-transient computer readable medium that stores a set of instructions that is executable by a memory apparatus to cause the memory apparatus to perform:

for a first computational layer:
  selecting a first set of storage blocks to operate as a set of read storage blocks that enable providing operands to at least one processing unit via read ports of the memory apparatus, and
  selecting a second set of storage blocks to operate as a set of write storage blocks that enable receiving operands for storage via write ports of the memory apparatus; and in a second computational layer that follows the first computational layer:
  selecting the first set of storage blocks to operate as the set of write storage blocks, and
  selecting the second set of storage blocks to operate as the set of read storage blocks.

24. The computer readable medium of claim 23, wherein the set of instructions that is executable by the memory apparatus to cause the memory apparatus to perform:

controlling an operational mode of the first and second sets of storage blocks for each computational layer; and setting the operational mode of the first and second sets of storage blocks based on the received instructions.

25. The computer readable medium of claim 24, wherein the set of instructions that is executable by the memory apparatus to cause the memory apparatus to perform:

setting the operational mode of the first set of storage blocks to a computational mode such that the first set of storage blocks are configured to read, operands to be used in a computation, via the at least one processing unit, to be executed in the first computational layer.

26. The computer readable medium of claim 24, wherein the second set of storage blocks comprises a first storage block and a second storage block, and wherein the set of instructions that is executable by the memory apparatus to cause the memory apparatus to perform:

setting the operational mode of a first storage block, of the second set of storage blocks, to a result mode such the first storage block is configured to write, within the first storage block, a result of the executed computation in the first computational layer.

27. The computer readable medium of claim 24, wherein the first set of storage blocks comprises a first storage block and a second storage block, and wherein the set of instructions that is executable by the memory apparatus to cause the memory apparatus to perform:

setting the operational mode of a second storage block, in the first set of storage blocks, to a preload mode such that the second storage block is configured to write a preload operand, within the second storage block, to be used in a computation to be executed in the second computational layer.

28. The computer readable medium of claim 24, wherein the set of instructions that is executable by the memory apparatus to cause the memory apparatus to perform:

setting the operational mode of the second set of storage blocks to operate in the computational mode such that the second set of storage blocks are configured to read operands, which were written by the second set of storage blocks within the first computational layer, to the at least one processing unit to execute a computation of the second computational layer.

29. The computer readable medium of claim 24, wherein the set of instructions that is executable by the memory apparatus to cause the memory apparatus to perform:

setting the operational mode of the first storage block, of the first set of storage blocks, to the result mode such that the first storage block is configured to write, within the first storage block, a result of an executed computation in the second computational layer.

30. The computer readable medium of claim 24, wherein the set of instructions that is executable by the memory apparatus to cause the memory apparatus to perform:
 setting the operational mode of the second storage block, of the first set of storage blocks, to the preload mode such that the second storage block is configured to write, within the second storage block, a preload operand to be used in the computation to be executed in the third computational layer.

31. A method for controlling a memory apparatus, the method comprising:
 for a first computation layer:
  operating a first set of storage blocks as a set of read storage blocks that enable providing operands to processing units via read ports of the memory apparatus, and
  operating a second set of storage blocks as a set of write storage blocks that enable receiving operands for storage via write ports of the memory apparatus; and
 for a second computation layer that follows the first computation layer:
  operating the first set of storage blocks as the set of write storage blocks, and
  operating the second set of storage blocks as the set of read storage blocks.

32. The method of claim 31, further comprising
 receiving instructions, from a compiler, to control an operational mode of the first and second sets of storage blocks for each computational layer; and
 setting the operational mode of the first and second sets of storage blocks based on the received instructions.

33. The method of claim 32, wherein the receiving and setting occurs dynamically at the start of each computational layer.

34. The method of claim 32, wherein the setting further comprises:
 setting the operational mode of the first set of storage blocks to a computational mode such that the first set of storage blocks are configured to read, operands to be used in a computation, via the at least one processing unit, to be executed in the first computational layer.

35. The method of claim 32, wherein the second set of storage blocks comprises a first storage block and a second storage block, and wherein the setting further comprises:
 setting the operational mode of a first storage block, of the second set of storage blocks, to a result mode such that the first storage block is configured to write, within the first storage block, a result of the executed computation in the first computational layer.

36. The method of claim 32, wherein the first set of storage blocks comprises a first storage block and a second storage block, and wherein the setting further comprises:
 setting the operational mode of a second storage block, in the first set of storage blocks, to a preload mode such that the second storage block is configured to write a preload operand, within the second storage block, to be used in a computation to be executed in the second computational layer.

37. The method of claim 32, wherein the setting further comprises:
 setting the second set of storage blocks to operate in the computational mode such that the second set of storage blocks are configured to read operands, which were written by the second set of storage blocks within the first computational layer, to the at least one processing unit to execute a computation of the second computational layer.

38. The method of claim 32, wherein the setting further comprises:
 setting the operational mode of the first storage block, of the first set of storage blocks, to the result mode such that the first storage block is configured to write, within the first storage block, a result of an executed computation in the second computational layer.

39. The method of claim 32, wherein the setting further comprises:
 setting the operational mode of the second storage block, of the first set of storage blocks, to the preload mode such that the second storage block is configured to write, within the second storage block, a preload operand to be used in the computation to be executed in the third computational layer.

* * * * *